Jan. 10, 1961  J. A. CUNNINGHAM ET AL  2,967,693
PELLET TYPE HEAT EXCHANGER
Filed Aug. 31, 1956
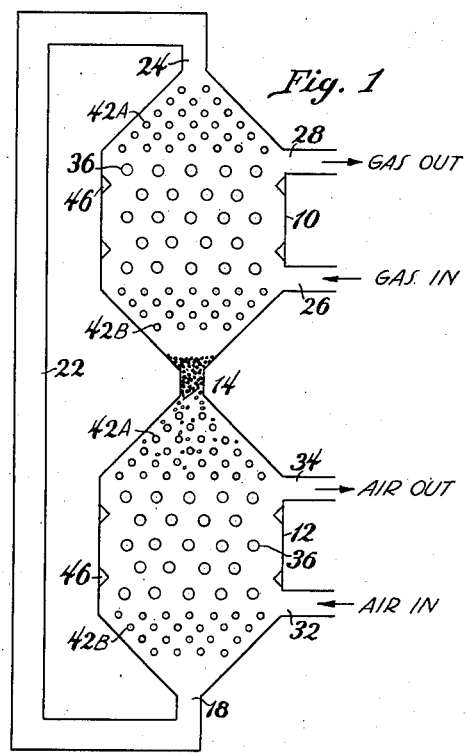
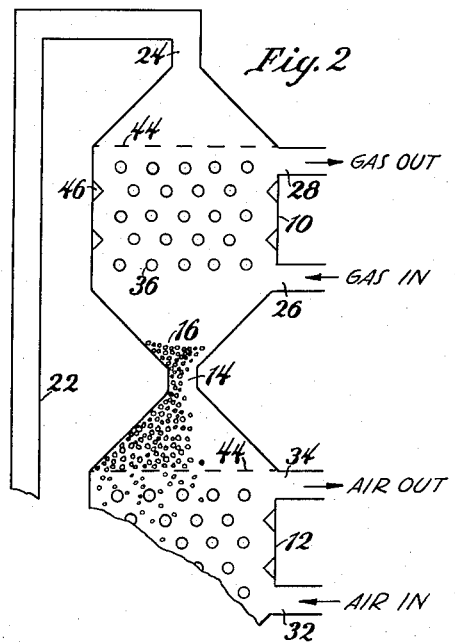
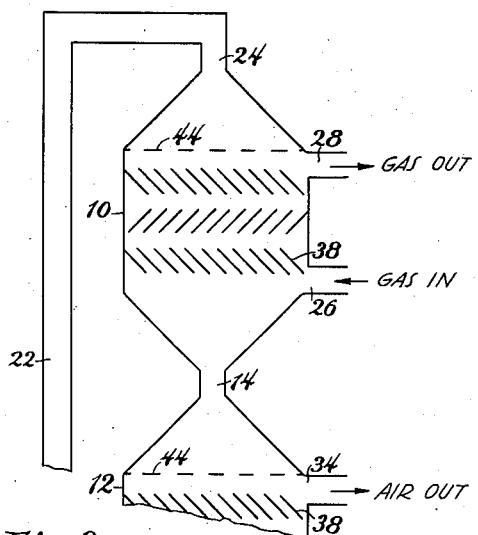
INVENTORS
John A. Cunningham
Andrew J. Anthony
By Wayne H. Lang
AGENT

United States Patent Office 2,967,693
Patented Jan. 10, 1961

2,967,693

PELLET TYPE HEAT EXCHANGER

John A. Cunningham, Wellsville, N.Y., and Andrew J. Anthony, Tariffville, Conn., assignors to The Air Preheater Corporation, New York, N.Y., a corporation of New York Filed Aug. 31, 1956, Ser. No. 607,393

3 Claims. (Cl. 257—55)

The present invention relates to apparatus adapted to effect contact between a stream of gas or vapor and a continuously flowing supply of granular solids. More particularly the present invention relates to apparatus which regulates the flow of granular solids so as to effect adequate dispersion thereof while simultaneously retarding their flow through the air and gas vapors for a period sufficient to provide retention time necessary for a specified efficiency of operation.

Apparatus of the type referred to usually comprises an enclosure having an array of superposed perforated plates or baffles to which granular solids are supplied to the top thereof while hot gas enters the bottom of the enclosure to rise through the perforations in the plates and contact the granular solids moving downward therethrough. In certain instances the superposed perforated plates or baffles have been eliminated to remove all restraining means for the granular material whereby it may fall unimpeded contrary to the direction of flow of the rising gas current.

In the first instance suggested the perforated plates or baffles retain the pellets in the gas stream for relatively long periods of time to provide a high degree of heat transfer at the expense of correspondingly high resistance to fluid flow. In the latter instance, the freely falling pellets by themselves impart little resistance to the flow of fluid during the period of mutual contact to provide only limited retention for the pellets and a similarly limited transfer of heat.

Since the transfer of heat in a pellet type heat exchanger depends primarily upon immersing a mass of pellets in a fluid stream for a predetermined period of time, a design for a pellet heat exchanger must include some arrangement for retaining the pellets in the fluid stream for a period of time sufficient to permit the desired transfer of heat. Furthermore, provision must be made to evenly distribute the pellets throughout the enclosure whereby each particle of granular material is thoroughly exposed to the stream of fluid during its passage therethrough.

In designing a pellet type heat exchange device the interval that the pellets must remain immersed in each particular fluid to secure a predetermined efficiency of operation is dependent to a large extent upon the thoroughness by which the pellets and gases have been mixed. It is therefore important that we approach a condition where if a plane is passed through the main heat transfer section of the chamber either horizontally, vertically or at an intermediate angle, a uniform density of pellets will be found to provide an optimum of dispersion. Any deviation from this optimum will result in a reduction of operating efficiency, even though the retention time may remain the same. When optimum dispersion is quickly and economically accomplished, the unit cost may be reduced to a minimum.

None of the arrangements common to pellet type heat exchangers have successfully endeavored to provide a uniform dispersion of pellets while retarding their flow sufficiently to obtain an optimum of heat transfer, therefore the principal object of this invention is to provide such an optimum through the application of specific pellet restraining and distributing means. Other ancillary objects of our invention will become more apparent from consideration of the accompanying disclosure of which this is a part.

A more complete understanding of the invention may be had by reference to the drawing in which:

Figure 1 is a sectional elevation of one form of our invention.

Figure 2 is a sectional elevation of a modified form of the invention.

Figure 3 is a sectional elevation of still another form of the invention.

In accordance with Figures 1 to 3 we provide a pair of superposed housing sections 10 and 12 interconnected by a restricted orifice 14 through which granular material or pellets 16 from the upper section 10 may descend to subjacent section 12. Pellets entering housing section 12 in turn descend through the housing to an outlet 18 where they are entrained by a conveyor 22 and returned to the top of housing 10 for readmission to housing 10 through inlet 24. Hot gas admitted to the lower portion of housing 10 through port 26 passes upward in opposition to the descending pellets to gas outlet port 28 while air for combustion entering housing 12 through air inlet port 32 passes upward in counter current relation to the descending pellets to outlet port 34. While traversing housing 10 the hot gas gives up heat to the counter flowing pellets, and conversely while in air chamber 12 the heated pellets give up their heat to the counter flowing air.

The particular improvement proposed by this invention includes a series of rods 36 (Figures 1 and 2) or baffles 38 (Figure 3) which are disposed in spaced parallel relation horizontally across the housings 10 and 12 to provide both pellet dispersing and retaining means, the relative size and spacing of the rods being directly dependent upon predetermined operating conditions. In this respect tests have indicated that the retention time of pellets falling through a matrix of rods having a diameter "D" of .109 inch increases appreciably as the distance between rods is reduced from 3.0 "D" to 2.25 "D". With a "D" of .1875 inch the increase in retention time for the same reduction in spacing is relatively small.

Since a "D" of .1875 inch is probably a minimum for all practical considerations, it becomes apparent that little retention time is gained with relation to the increased pressure drop by maintaining the spacings less than 3.0 inches "D.". It has also been determined experimentally that from three to five layers of parallel rods 36 spaced according to the invention provide effective dispersion of the pellets, this particular feature being utilized in the arrangement of Figures 1 and 2 to distribute the pellets evenly throughout the entire chamber.

By the proper consideration of the various design features, it is therefore possible to design a pellet chamber having transverse rods to provide adequate pellet dispersion and any predetermined retention period.

In a preferred form of the invention as illustrated in Figure 1 restraining rods 36 are disposed across the housing 10 in the space between gas inlet duct 26 and outlet duct 28 and also across housing 12 in the space between air inlet duct 32 and outlet duct 34 while a plurality of rows of evenly spaced rods 42 somewhat smaller and closer together than rods 36 are similarly disposed in each housing at opposite ends thereof. Rods 42A serve the dual function of distributing the pellets being supplied from inlet 24 or orifice 14 entirely across each housing in advance of rods 36. While they simultaneously restrain pellet flow at inlet 24 and at orifice 14 to provide a concentration of pellets sufficient to restrict fluid flow therethrough. Rods 42B are similar in size and spacing to rods 42A. However, their position at the lower portion of housings 10 and 12 limits their function to that of pellet restraining means which reduces pellet velocity so as to preclude attrition and spalling while permitting a concentration of pellets to effect a fluid seal.

The cross sectional configuration of the distributing and retaining rods 36, 42A and 42B may be varied to provide additional pellet retention characteristics, as for example by providing the rods with a streamline shape having a relatively flat upper surface to present to the falling pellets whereby the vertical component of rebound will be increased together with a proportional increase in pellet retention time.

In order that all pellets which traverse the housing 10 and 12 are subjected to the dispersal and retention effects of the transverse rods 36 special deflectors 46 are installed along the sides of the housing parallel to the rods 36.

In the form of the invention illustrated in Figure 2 a perforate plate 44 is utilized adjacent the upper end of each housing 10 and 12 to provide a concentration of pellets for sealing purposes. Pellets falling through the perforation in plates 44 contact the rods 36 for subsequent dispersion and retention effects as for the device of Figure 1.

Figure 3 is directed to a further modification utilizing a series of parallel baffle members 38 alternately inclined to direct the pellets through a tortuous path between inlet and subjacent outlet. Perforate plates 44 at the upper ends of the housings 10 and 12 are again utilized to retard the pellets for sealing purposes. However, in this form as in those disclosed by Figures 1 and 2 spaced rods 42A and 42B could be readily utilized.

While this invention has been described with reference to the embodiment illustrated in the drawing it is evident that numerous changes could be made without departing from the spirit of the invention, and it is therefore intended that all matter contained in the above description or shown in the accompanying drawings shall be interpreted as illustrative and not in a limiting sense.

What is claimed is:

1. Pellet heat exchange apparatus or the like having a closed, upright housing with a pellet inlet port at its uppermost end and a pellet outlet port at its remotely spaced end; a fluid inlet port in the housing spaced above the pellet outlet port and a fluid outlet port in the housing subjacent the pellet inlet port adapted to permit fluid to flow in opposition to the normal flow of pellets through the housing; layers of laterally spaced rod members extending transversely across the housing intermediate the fluid inlet and fluid outlet ports adapted and arranged to distribute the pellets evenly while simultaneously retarding their passage through the housing; and other layers of laterally spaced rod members spaced apart a distance less than the first named layers and extending across the housing intermediate the pellet inlet and fluid outlet ports adapted to diffuse the pellets and retard their flow sufficient to provide a concentration of pellets effecting a fluid seal.

2. Pellet heat exchange apparatus as defined in claim 1 where the rod members lying between pellet inlet and fluid outlet ports are of lesser diameter than those lying between fluid inlet and outlet ports.

3. Pellet heat exchange apparatus as defined in claim 2 wherein the rod members are spaced apart a distance equal to from 2 to 4 times the diameter of the rods.

References Cited in the file of this patent

UNITED STATES PATENTS

| | | |
|---|---|---|
| 1,148,331 | Olsson | July 27, 1915 |
| 1,533,572 | Richards | Apr. 14, 1925 |
| 1,905,883 | Barstow et al. | Apr. 25, 1933 |
| 2,379,195 | Simpson et al. | June 26, 1945 |
| 2,417,393 | Evans | Mar. 11, 1947 |
| 2,458,434 | Simpson | Jan. 4, 1949 |
| 2,559,069 | England | July 3, 1951 |
| 2,639,215 | Bland | May 19, 1953 |
| 2,741,603 | Fahnestock | Apr. 10, 1956 |